United States Patent
Tamura

(10) Patent No.: US 8,259,188 B2
(45) Date of Patent: Sep. 4, 2012

(54) IMAGE PROCESSING APPARATUS AND METHOD THEREOF

(75) Inventor: Nobuhiko Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 12/499,407

(22) Filed: Jul. 8, 2009

(65) Prior Publication Data
US 2010/0013858 A1 Jan. 21, 2010

(30) Foreign Application Priority Data
Jul. 17, 2008 (JP) ................................. 2008-186503

(51) Int. Cl.
*H04N 5/228* (2006.01)
(52) U.S. Cl. ............................... 348/222.1; 348/333.12
(58) Field of Classification Search .................. 348/241, 348/242, 239, 249, 362, 364, 365, 222.1, 348/223.1, 225.1, 229.1, 333.01, 333.02, 348/333.05, 333.12; 382/275, 309, 254; 345/630, 619

See application file for complete search history.

(56) References Cited

U.S. PATENT DOCUMENTS

| | | | |
|---|---|---|---|
| 7,259,786 B2* | 8/2007 | Shimizu | 348/231.6 |
| 7,324,749 B2* | 1/2008 | Kubo | 396/429 |
| 7,620,218 B2* | 11/2009 | Steinberg et al. | 382/118 |
| 7,656,442 B2* | 2/2010 | Tsuruoka | 348/241 |
| 8,111,321 B2* | 2/2012 | Yoshida | 348/345 |
| 2001/0020978 A1* | 9/2001 | Matsui et al. | 348/222 |
| 2003/0076312 A1* | 4/2003 | Yokoyama | 345/204 |
| 2005/0094007 A1* | 5/2005 | Nomura et al. | 348/272 |
| 2005/0174449 A1* | 8/2005 | Matsuzaka | 348/240.3 |
| 2005/0212819 A1* | 9/2005 | Kubo et al. | 345/619 |
| 2006/0050954 A1* | 3/2006 | Minakuti et al. | 382/162 |
| 2006/0163450 A1* | 7/2006 | Oyama | 250/208.1 |
| 2008/0085062 A1* | 4/2008 | Tsuruoka | 382/284 |
| 2008/0199074 A1* | 8/2008 | Mitsunaga | 382/169 |
| 2009/0002514 A1* | 1/2009 | Steinberg et al. | 348/222.1 |
| 2010/0045825 A1* | 2/2010 | Hatori et al. | 348/241 |
| 2012/0062761 A1* | 3/2012 | Ianculescu et al. | 348/222.1 |

FOREIGN PATENT DOCUMENTS

| | | |
|---|---|---|
| EP | 1954030 A | 8/2008 |
| JP | 11-275351 A | 10/1999 |
| JP | 2004-040559 | 2/2004 |
| JP | 2005-102175 A | 4/2005 |

OTHER PUBLICATIONS

The above references were cited in a Apr. 20, 2012 Japanese Office Action, which is enclosed without English Translation, that issued in Japanese Patent Application No. 2008-186503.

All of the above references were cited in a Oct. 7, 2009 European Search Report of the counterpart European Patent Application No. 09165598.5.

* cited by examiner

Primary Examiner — Aung S Moe
(74) Attorney, Agent, or Firm — Cowan, Liebowitz & Latman, P.C.

(57) ABSTRACT

Upon applying a demosaicing process to a photographic image, a display image is generated from the photographic image to which the demosaicing process is applied, and an instruction indicating a reference region on the display image, and an adjustment instruction of parameters for a development process are input. Then, an image region having a high correlation with the reference region is extracted as a similar region, and display images of the reference region and similar region are generated by applying the parameters for the development process to the photographic image before the demosaicing process, which corresponds to the reference region, and that before the demosaicing process, which corresponds to the similar region.

15 Claims, 9 Drawing Sheets

| R | G | R | G | R |
|---|---|---|---|---|
| G | B | G | B | G |
| R | G | R | G | R |
| G | B | G | B | G |
| R | G | R | G | R |

FIG. 9A

| R | 0 | R | 0 | R |
|---|---|---|---|---|
| 0 | 0 | 0 | 0 | 0 |
| R | 0 | R | 0 | R |
| 0 | 0 | 0 | 0 | 0 |
| R | 0 | R | 0 | R |

FIG. 9B

| 0 | G | 0 | G | 0 |
|---|---|---|---|---|
| G | 0 | G | 0 | G |
| 0 | G | 0 | G | 0 |
| G | 0 | G | 0 | G |
| 0 | G | 0 | G | 0 |

FIG. 9C

| 0 | 0 | 0 | 0 | 0 |
|---|---|---|---|---|
| 0 | B | 0 | B | 0 |
| 0 | 0 | 0 | 0 | 0 |
| 0 | B | 0 | B | 0 |
| 0 | 0 | 0 | 0 | 0 |

FIG. 10A

| 1/4 | 1/2 | 1/4 |
|---|---|---|
| 1/2 | 1 | 1/2 |
| 1/4 | 1/2 | 1/4 |

FIG. 10B

| 0 | 1/4 | 0 |
|---|---|---|
| 1/4 | 1 | 1/4 |
| 0 | 1/4 | 0 |

FIG. 11A
| | G1 | |
|---|---|---|
| G4 | 0 | G2 |
| | G3 | |
FIG. 11B
| | G1 | |
|---|---|---|
| G4 | (G1+G2+G3+G4)/4 | G2 |
| | G3 | |
FIG. 12A
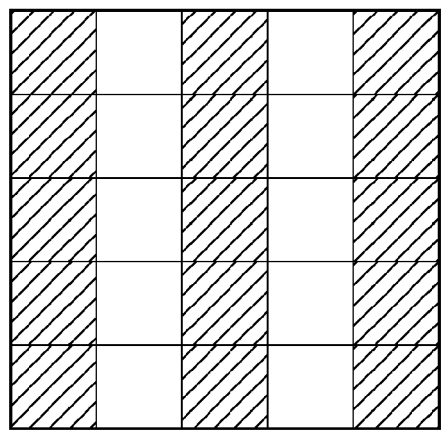
FIG. 12B
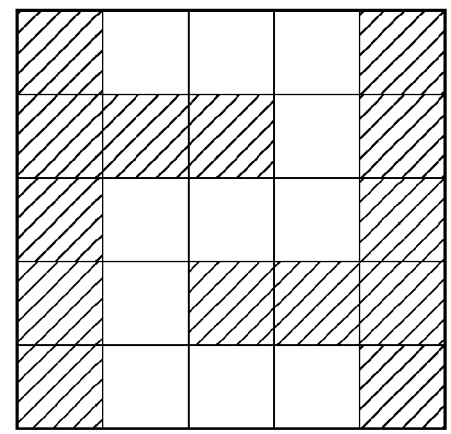

IMAGE PROCESSING APPARATUS AND METHOD THEREOF

BACKGROUND OF THE INVENTION

1. Field of the Invention

The present invention relates to an image processing apparatus that applies an image process to a photographic image, and a method thereof.

2. Description of the Related Art

In recent years, digital cameras have made amazing progress, and various functions such as enhancement of the number of pixels, that of sensitivity, and implementation of camera shake correction have advanced. Also, price reductions of digital single-lens reflex cameras have progressed, and are promoting further prevalence of digital cameras.

One advantage of a digital camera over a film camera is, it is to easy to retouch an image after capture since the image is handled as digital data. A digital camera converts light focused on a sensing device such as a CCD (charge coupled device) or CMOS (complementary metal oxide semiconductor) sensor into an electrical signal, and saves a photographic image that has undergone an image process inside the camera on a recording medium as digital data. As a data format, a data compression format such as JPEG (Joint Photographic Experts Group) is generally used. In recent years, digital data can be saved in a photographic data format that allows retouching with a higher degree of freedom.

Photographic image data is obtained by converting a signal output from a sensing device into digital data (to be referred to as RAW data hereinafter), without applying demosaicing. Therefore, this RAW data cannot be displayed as a normal image as it is.

The RAW data will be briefly described below. Most sensing apparatuses such as digital cameras and digital video cameras acquire color information of an object by arranging specific color filters in front of respective photoelectric conversion elements of a sensing device. This type will be referred to as a 1 CCD type hereinafter. FIG. 8 is a view showing a Bayer arrangement known as a typical color filter arrangement used in a 1-CCD type digital camera or digital video camera. In case of a 1-CCD type sensing apparatus, it is impossible to obtain, from an element in front of which a filter of a specific color exists, a signal of another color. Hence, a signal of another color is calculated by interpolating signals of neighboring elements. This interpolation process will be referred to as demosaicing hereinafter.

Demosaicing will be described below taking as an example a case in which color filters have the Bayer arrangement shown in FIG. 8. A sensor signal which is obtained from a photoelectric conversion device and includes RGB colors is separated into three planes, that is, R, G, and B planes. FIGS. 9A to 9C are views showing planes obtained by separating a sensor signal. FIG. 9A shows an R plane, FIG. 9B shows a G plane, and FIG. 9C shows a B plane. Note that "zero" is inserted in a pixel whose value is unknown (a pixel corresponding to an element in front of which a filter of a color other than the color of interest is arranged) in each plane.

FIGS. 10A and 10B show convolution filters, which are used to interpolate the respective planes to perform demosaicing. FIG. 10A shows a filter used to interpolate the R and B planes, and FIG. 10B shows a filter used to interpolate the G plane.

FIGS. 11A and 11B show how the G plane is demosaiced. FIG. 11A shows the state of the G plane before demosaicing, in which the value of a central pixel is unknown, and zero is inserted. FIG. 11B shows the state of the G plane after demosaicing, in which the average value of values of upper, lower, right, and left neighboring pixels is assigned to the central pixel whose value is unknown. For the R and B planes as well, a pixel whose value is unknown is interpolated using the values of surrounding pixels as in the G plane.

Note that the demosaicing process can also be attained by various other methods in addition to the aforementioned method. For example, a method of adaptively interpolating an unknown value with the average of the values of upper and lower neighboring pixels or with the average of the values of right and left neighboring pixels instead of the average of the values of upper, lower, right, and left neighboring pixels may be used.

RAW data is temporarily saved in a recording medium at the time of image capture, and then undergoes an image process such as a demosaicing process by software or the like which runs on a personal computer (PC). An image, after the image process, can be displayed or saved in a recording medium after it is converted into a general-purpose data format such as JPEG. That is, the process for using RAW data in a digital camera can be reduced to an exposure process and development process in a film camera.

Using the RAW data, user adjustments of an image process corresponding to development (to be referred to as a development process) are allowed, thus increasing the degree of freedom in retouching. Since the RAW data has a large number of bits per pixel, and is losslessly compressed, a development process with less deterioration of image quality can be attained.

Software used to implement the development process (to be referred to as development software hereinafter) generally includes an interface of a display function of displaying an image after the development process, and an interface of an adjustment function of adjusting parameters for the development process. The parameters for the development process that allow user adjustments include parameters of an edge-emphasis process, those of a blur process, color adjustment parameters, and those associated with demosaicing. The user adjusts the parameters for the development process while observing a displayed image, and updates the display image based on the adjusted parameters for the development process. The user decides the parameters for the development process to obtain a desired display image by repeating this sequence.

Most digital cameras which allow the use of RAW data are high-end models such as digital single-lens reflex cameras. High-end models generally have a large number of photographic pixels, and the size of RAW data becomes quite large. For this reason, the computational load of the development processing is heavy, and a long time is required from when the user adjusts the parameters for the development process until an image that has undergone the image process again is displayed. A technique disclosed in Japanese Patent Laid-Open No. 2004-040559 improves the processing efficiency by applying an image process to an image of a partial region of a photographic image and displaying that image.

However, with the technique disclosed in Japanese Patent Laid-Open No. 2004-040559, since the user decides the parameters for the development process with reference to a partial region of a photographic image (to be referred to as a reference region hereinafter), how the development process influences a region other than the reference region after the parameters for the development process are adjusted is unknown. In other words, when the development process is applied to the entire image after the parameters for the development process are adjusted, an image as the user intended can be obtained in the reference region, but an image that the user intended cannot often be obtained in regions other than the reference region.

SUMMARY OF THE INVENTION

In one aspect, a method executed by an image processing apparatus for applying a development process to a photographic image, the method comprising: generating a display image from the photographic image; inputting an instruction indicating a reference region of the display image, and an adjustment instruction of a parameter for the development process of the photographic image; extracting, as a similar region, an image region having a high correlation with the reference region; and generating display images of the reference region and the similar region by applying the parameter for the development process to the photographic image, which corresponds to the reference region, and the photographic image which corresponds to the similar region.

According to the aspect, processing efficiency in a development process is improved, and a processing result that the user intended is obtained.

Further features of the present invention will become apparent from the following description of exemplary embodiments with reference to the attached drawings.

BRIEF DESCRIPTION OF THE DRAWINGS

FIGS. 9A to 9C are views for explaining plane separation and zero insertion.

FIGS. 10A and 10B are views showing an example of filters used in demosaicing.

FIGS. 11A and 11B are views for explaining demosaicing.

FIGS. 12A and 12B are views for explaining "maze artifact".

DESCRIPTION OF THE EMBODIMENTS

An image processing apparatus and method thereof according to the embodiments of the present invention will be described in detail hereinafter with reference to the drawings.
First Embodiment
[Apparatus Arrangement]

Figure 1:
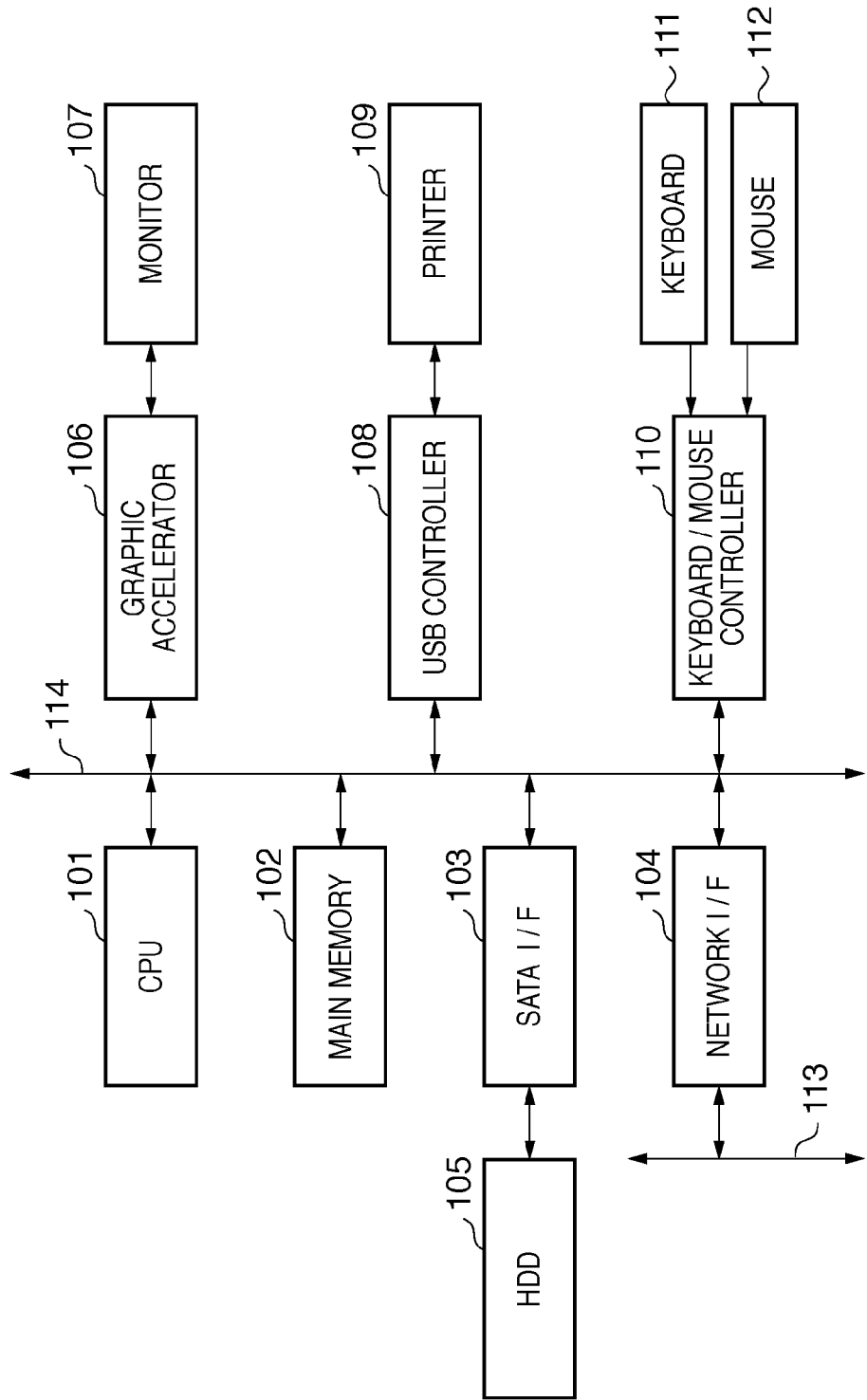
FIG. 1 is a block diagram showing the arrangement of an image processing apparatus.

FIG. 1 is a block diagram showing the arrangement of an image processing apparatus.

A microprocessor (CPU) 101 executes an operating system (OS) and various programs stored in a read only memory (ROM) of a main memory 102 and hard disk drive (HDD) 105 using a random access memory (RAM) of the main memory 102 as a work memory. Then, the CPU 101 controls respective components via a system bus 114 such as a peripheral component interconnect (PCI) bus.

Furthermore, the CPU 101 executes various programs including a development process application (to be described later).

The CPU 101 accesses the HDD 105 via the system bus 114 and a serial ATA interface (SATA I/F) 103. Also, the CPU 101 accesses a network 113 such as a local area network (LAN) via a network I/F 104.

In the following description, the CPU 101 reads out the development process application, image data, and the like from the HDD 105. Alternatively, the CPU 101 may read them out from a server (not shown) on the network 113.

The CPU 101 displays user interfaces of the processes to be described later and the processing result on a monitor 107 via a graphic accelerator 106, and inputs a user instruction via a keyboard 111 and mouse 112 connected to a keyboard/mouse controller 110.

The CPU 101 outputs image data to a printer 109 via a USB (Universal Serial Bus) controller 108, and prints, for example, an image designated by the user.
[Image Process]

Figure 2:
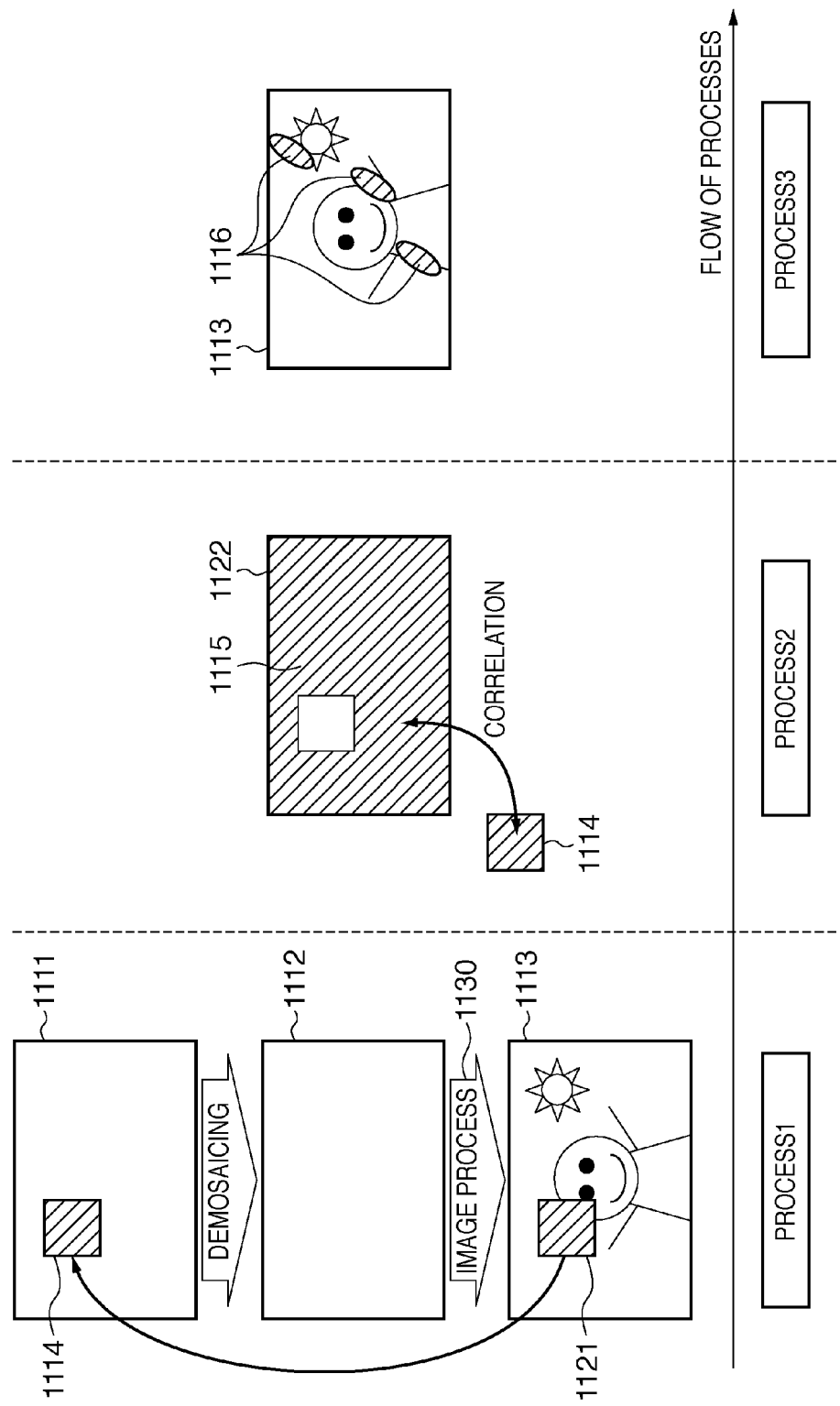
FIG. 2 is a view showing an overview of processes by a development process application according to the first embodiment.

FIG. 2 is a view showing an overview of processes by a development process application according to the first embodiment, and the development process is roughly classified into process 1, process 2, and process 3.

As will be described in detail later, in process 1, RAW data 1114 of a reference region 1121, which is designated on a display image 1113 and is used to adjust parameters for a development process, is acquired. In process 2, correlations between the reference region 1121 and other regions are calculated. Then, in process 3, an image region with a high correlation is displayed.

Figure 3:
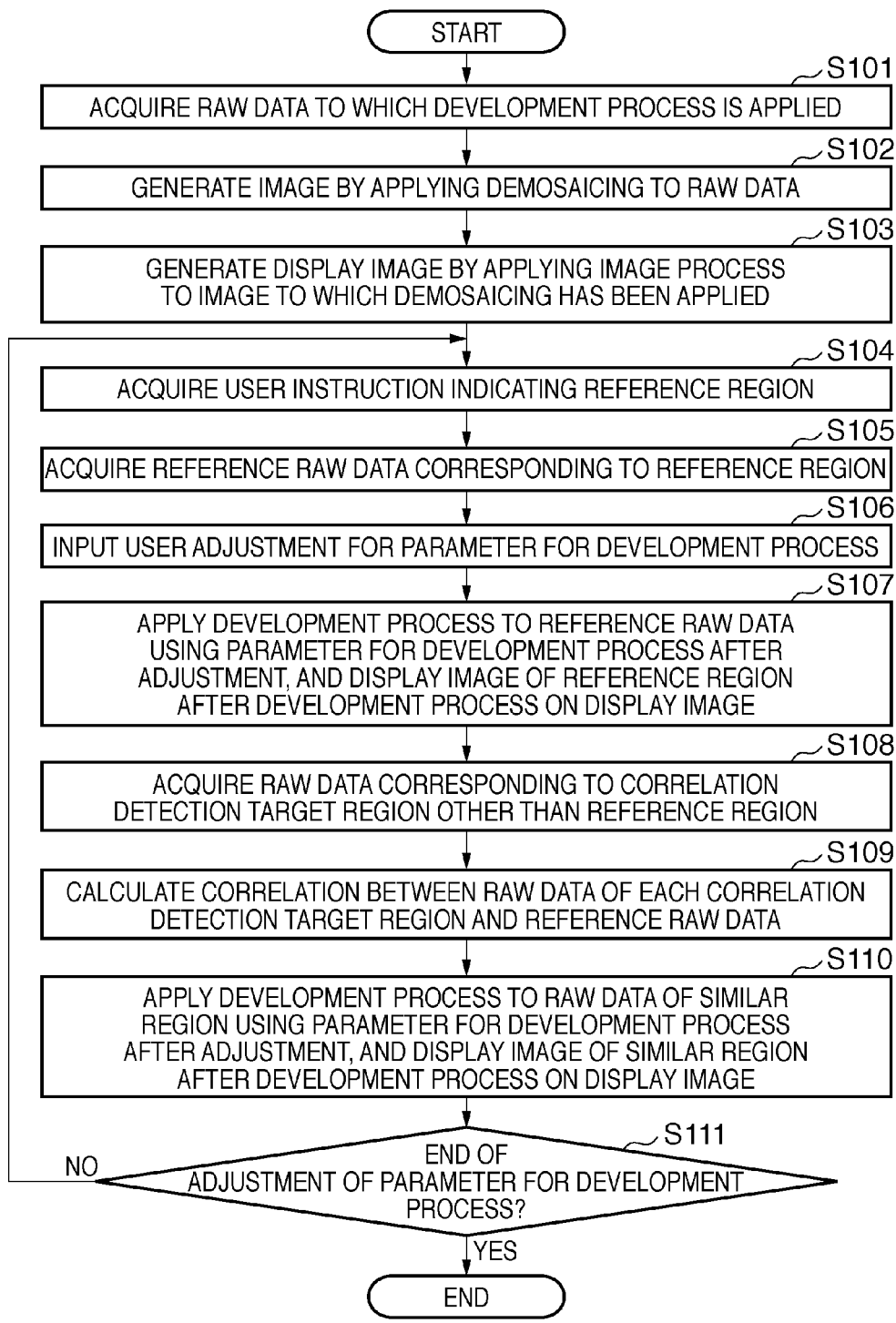
FIG. 3 is a flowchart for explaining a development process according to the first embodiment.

FIG. 3 is a flowchart for explaining the development process according to the first embodiment. This process is executed by the CPU 101.

The CPU 101 acquires RAW data 1111 which is to undergo the development process (S101), and generates an image 1112 by applying demosaicing to the RAW data 1111 (S102). Note that for a 3-CCD type digital camera or a 1-CCD type digital camera which sequentially senses RGB images, demosaicing need not be performed, and the process in step S102 may be omitted.

The CPU 101 then applies an image process 1130 to the image 1112 that has undergone the demosaicing to generate a display image 1113, and displays the display image 1113 on the monitor 107 (S103). Then, the CPU 101 acquires a user instruction that designates a reference region 1121 on the display image 1113 (S104), and acquires RAW data (to be referred to as reference RAW data) 1114 corresponding to the reference region 1121 from the RAW data 1111 (S105).

Next, the CPU 101 receives a user's adjustment instruction for the parameters for the development process (S106), and applies the development process to the reference RAW data 1114 using the parameters for the development process after adjustment. Then, the CPU 101 displays the image of the reference region 1121 after the development process on the display image 1113 (S107). In this case, a frame that bounds the reference region 1121 is preferably displayed, so that the user can easily recognize the reference region 1121.

That is, steps S101 to S107 correspond to process 1.

The CPU 101 selects a region other than the reference region 1121 as a correlation detection target region 1122, and acquires RAW data 1115 corresponding to the correlation detection target region 1122 from the RAW data 1111 (S108). Then, the CPU 101 calculates a correlation between the RAW data 1115 and the reference RAW data 1114 in each region other than the reference region 1121 (S109).

That is, steps S108 and S109 correspond to process 2.

The CPU 101 applies the development process to RAW data of a region 1116 (to be referred to as a similar region hereinafter) having a high correlation with (similar to) the reference region 1121 using the parameters for the development process adjusted on the reference region 1121. Then, the CPU 101 displays an image of the similar region 1116 after the development process on the display image 1113 (S110). In this case, a frame that bounds the similar region 1116 is preferably displayed, so that the user can easily recognize the similar region 1116.

That is, step S110 corresponds to process 3.

The CPU 101 then determines whether or not the adjustment of the parameters for the development process is to end (e.g., the user presses an end button to instruct to end the process) (S111). If the adjustment is not to end, the process returns to step S104.

[Correlation Calculation]

Figure 4:
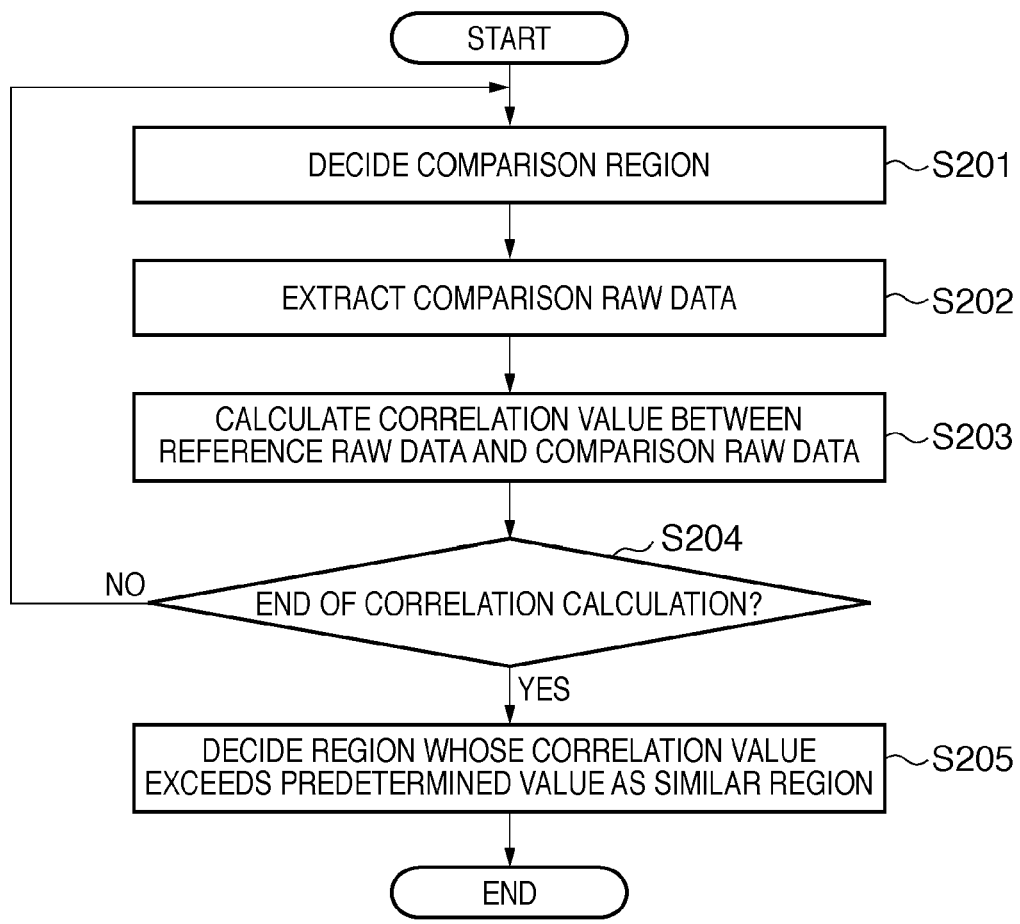
FIG. 4 is a flowchart for explaining correlation calculations.

FIG. 4 is a flowchart for explaining the correlation calculation (S109).

The CPU 101 decides a correlation calculation region (to be referred to as a comparison region hereinafter) (S201). Note that it is desirable to calculate correlations for the entire region of the correlation detection target RAW data 1115, but they may be calculated at predetermined pixel intervals. Alternatively, a correlation calculation region may be limited as needed (e.g., the user designates a correlation calculation region). Note that the size of the correlation calculation region is the same as that of the reference region 1121.

The CPU 101 extracts RAW data of the comparison region from the RAW data 1115 corresponding to the correlation detection target region, and sets it as comparison RAW data (S202). For example, when the reference region 1121 has a size of 5×5 pixels, the comparison region also has a size of 5×5 pixels.

The CPU 101 then calculates a correlation between the reference RAW data 1114 and comparison RAW data (S203). The correlation is calculated using:

$$\text{Corr} = \Sigma_i \Sigma_j \text{Iref}(i,j) \text{Icomp}(i,j) \quad (1)$$

where Corr is the correlation value, i is an index indicating the pixel position in the vertical direction, j is an index indicating the pixel position in the horizontal direction, Iref is the value of a pixel (i, j) of the reference RAW data, and Icomp is the value of a pixel (i, j) of the comparison RAW data.

The correlation may be calculated using equation (2) or other calculation methods. Furthermore, when a sensing apparatus is not of 1 CCD type, but of a type that records RGB data of a Bayer arrangement as RAW data, a correlation may be calculated only for pixels corresponding to G.

$$\text{Corr} = \Sigma_i \Sigma_j \{\text{Iref}(i,j) - \text{Iref}_{ave}\}\{\text{Icomp}(i,j) - \text{Icomp}_{ave}\} \quad (2)$$

where Corr is the correlation value, $\text{Iref}_{ave}$ is the average value of the reference RAW data, and $\text{Icomp}_{ave}$ is the average value of the comparison RAW data.

The CPU 101 determines whether or not correlation calculations of regions in which a correlation is to be calculated are complete (S204).

The CPU 101 repeats the processes in steps S201 to S203 until the correlations of all correlation calculation regions have been calculated.

Upon completion of the correlation calculations, the CPU 101 decides regions whose correlation value exceeds a predetermined value as similar regions 1116 (S205). Note that the similar region 1116 need not always have the same size as the reference region 1121. That is, when both the neighboring comparison regions are similar regions, a region obtained by combining them is decided as a similar region 1116.

Although not shown in FIG. 2, the CPU 101 displays, on the display image 1113, the image of the reference region 1121 and that of the similar region 1116, which have undergone the development process using the parameters for the development process after the adjustment. Therefore, the user can recognize whether or not the parameters for the development process after the adjustment are appropriate for the reference region 1121. Then, the user can visually evaluate the similar region 1116 with a high correlation with the reference region 1121 and how the parameters for the development process influence (or do not influence) the image of the similar region 1116.

In this case, since the CPU 101 does not apply any image process to regions with a low correlation with the reference region 1121, the processing efficiency can be improved compared to a case in which the RAW data 1111 (entire image) is processed using the parameters for the development process.

For example, when an edge-emphasis process is to be applied to an image region with a high spatial frequency such as a hair part (reference region) of a person, the processing effect of an image region with a relatively low spatial frequency such as sky above the head (non-similar region) need not always be confirmed. By presenting the reference region 1121 and similar region 1116, and displaying the development process effects of these regions, the processing load on the CPU 101 can be reduced.

Merits of detection of the similar region 1116 based on comparison between RAW data in place of images after development will be described below. To this end, image quality deterioration due to the development process will be explained first.

With image quality deterioration due to the development process, a pattern which does not exist on an actual object is often produced. Moiré is one phenomenon of the image quality deterioration due to the development process. In addition to moiré, image quality deterioration called "maze artifact" may occur depending on the development process methods. "Maze artifact" is image quality deterioration in which thin lines are connected in whorl on the pixel level, as shown in FIG. 12B, in an image after development, when an object in which thin lines are densely packed is sensed, as shown in FIG. 12A.

It is difficult to detect such image quality deterioration due to the development process from an image after development. This is because the user cannot discriminate whether an object originally has a pattern similar to a "maze artifact" or the "maze artifact" is generated as a result of the development process when he or she observes an image after development. This problem can be solved by detecting the similar region 1116 based on RAW data in place of detecting the similar region 1116 from an image after development. That is, when a region is similar at the time of RAW data, a result after the development process is also similar.

Second Embodiment

An image processing apparatus and method thereof according to the second embodiment of the present invention will be described below. Note that the same reference numerals in the second embodiment denote the same components as in the first embodiment, and a detailed description thereof will not be repeated.

The first embodiment has explained an example in which the parameters for the development process are adjusted for one photographic image. The second embodiment will explain a method of adjusting parameters for a development process common to a plurality of photographic images. When the parameters for the development process common to a plurality of photographic images are used, a similar region is not limited to one photographic image but it is included in other photographic images.

Figure 5:
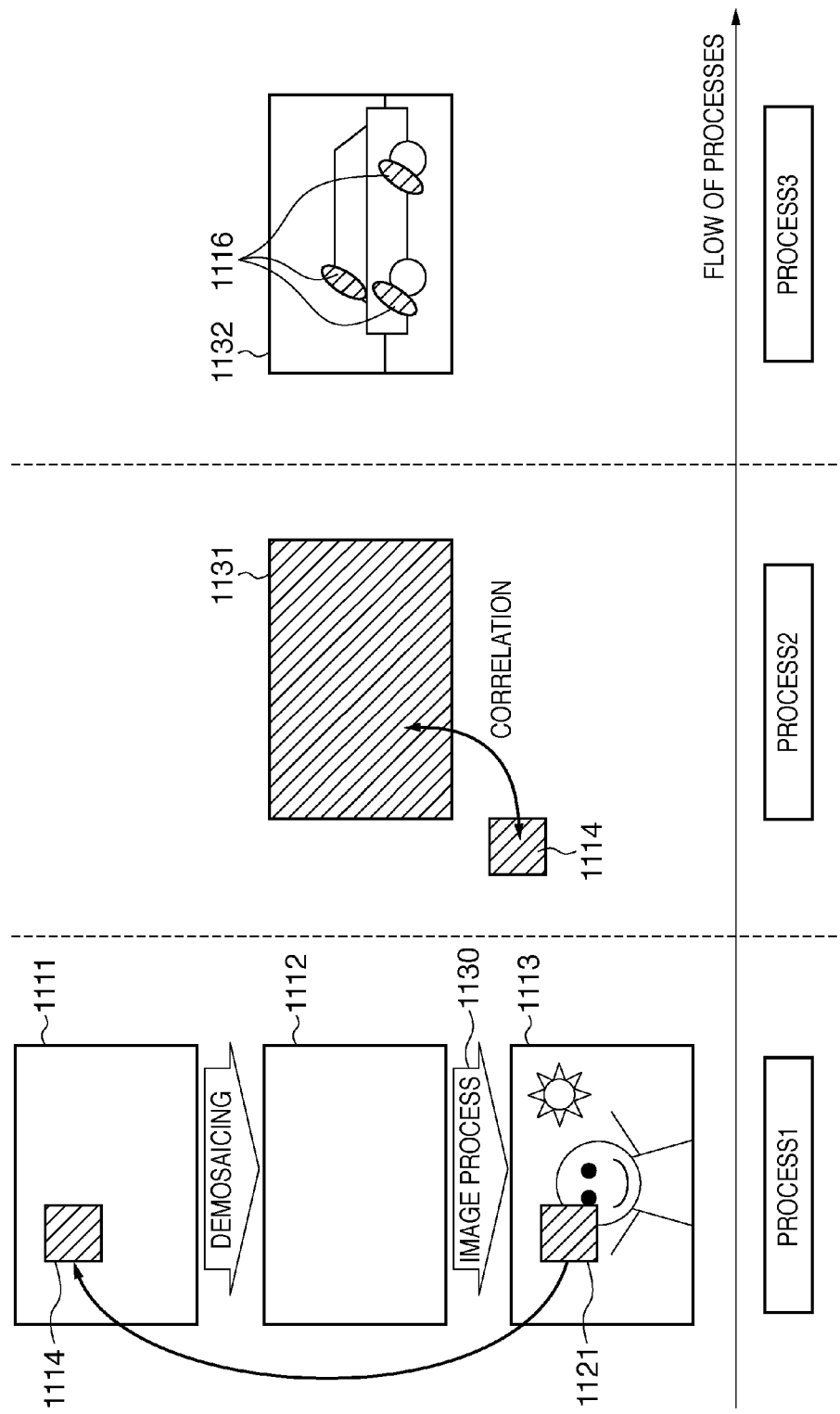
FIG. 5 is a view showing an overview of processes by a development process application according to the second embodiment.

FIG. 5 is a view showing an overview of processes by a development process application according to the second embodiment. The development process is roughly classified into process 1, process 2, and process 3.

Processes 1 and 3 are the same as those in the first embodiment. In process 2, a correlation is calculated with a photographic image which is included in a plurality of photographic images that are to undergo the development process, and is different from an image including the reference region 1121 (to be referred to as a reference image hereinafter).

Figure 6:
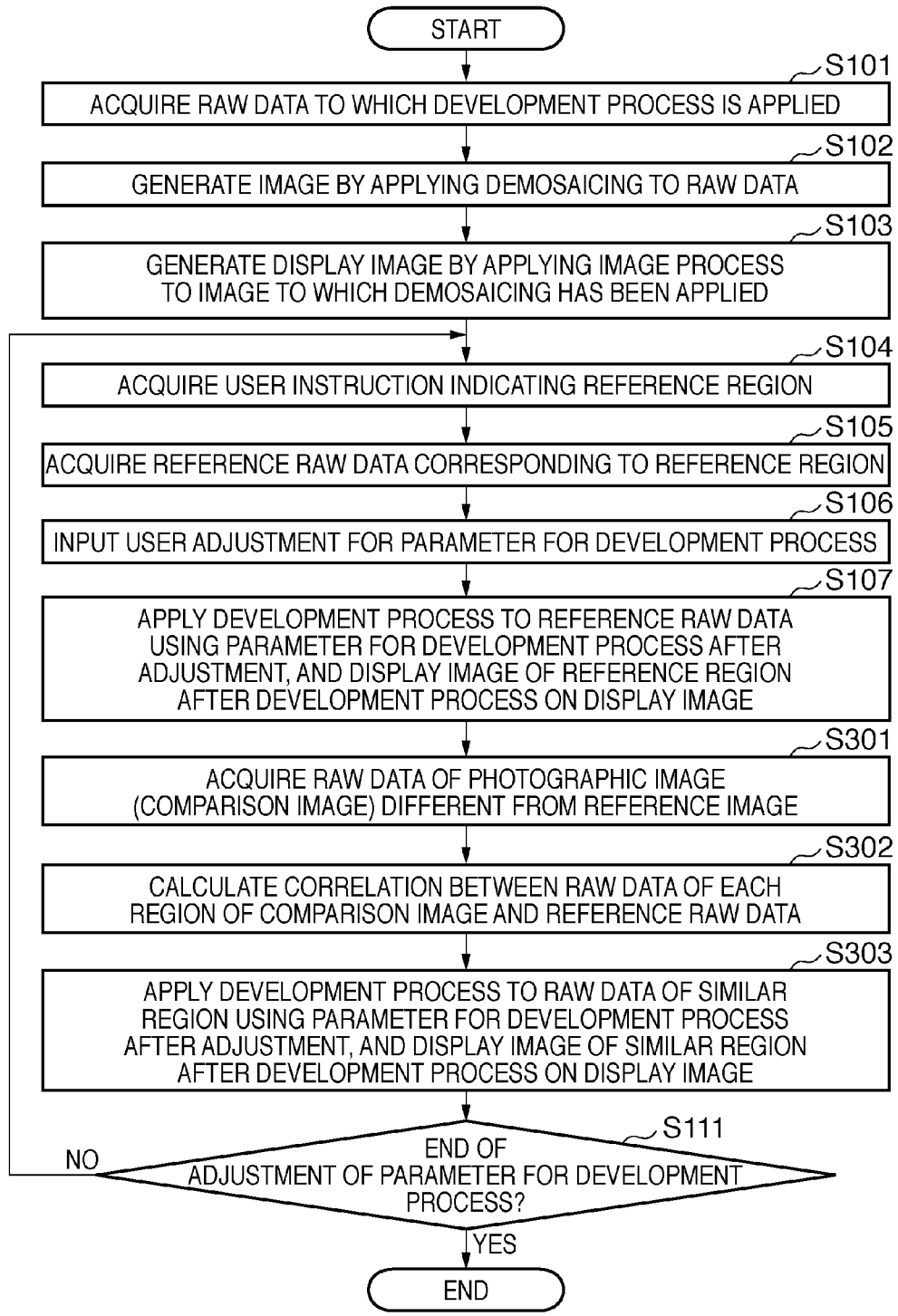
FIG. 6 is a flowchart for explaining a development process according to the second embodiment.

FIG. 6 is a flowchart for explaining the development process according to the second embodiment. This process is executed by the CPU 101.

Process 1 in steps S101 to S107 is the same as that of the first embodiment shown in FIG. 3.

Next, the CPU 101 selects a photographic image which is included in a plurality of photographic images that are to undergo the development process, and is different from the reference image (to be referred to as a comparison image hereinafter), and acquires RAW data 1131 of the comparison image (S301). The CPU 101 then calculates a correlation between the RAW data 1131 and reference RAW data 1114 in each region of the comparison image (S302). Note that the comparison image may be selected based on, for example, a user's input.

That is, steps S301 and S302 correspond to process 2.

The CPU 101 applies the development process to RAW data of the similar region 1116 using the parameters for the development process which are adjusted on the reference region 1121. The CPU 101 displays an image of the similar region 1116 after the development process on a display image 1132 of the comparison image displayed on an independent window (S303). In this case, a frame that bounds the similar region 1116 is preferably displayed, so that the user can easily recognize the similar region 1116. Also, when there are a plurality of comparison images, the user may observe a plurality of comparison images by displaying display images 1132 each indicating the similar region 1116 on windows as many as the number of comparison images, or by operating a scroll bar or the like.

That is, step S303 corresponds to process 3.

The CPU 101 then determines whether or not the adjustment of the parameters for the development process is to end (e.g., the user presses an end button to instruct to end the process) (S111). If the adjustment is not to end, the process returns to step S104.

Note that the development process application also executes the process of the similar region in a single image in the first embodiment, although a detailed description thereof will not be given.

Modification of Embodiments

Figures 7, 8:
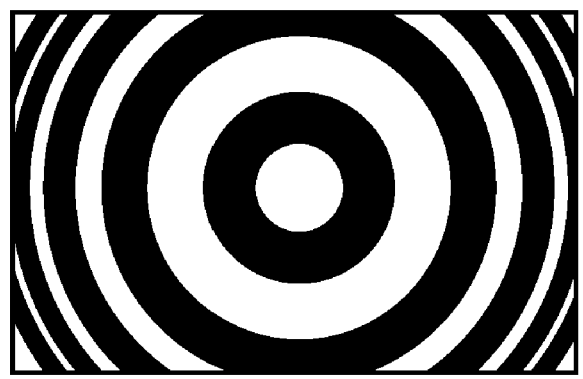
FIG. 7 is a view showing an example of a test chart.
FIG. 8 is a view showing a Bayer arrangement.

The second embodiment has described an example in which, for instance, a comparison image designated by the user is acquired, and the parameters for the development process, which are adjusted on the reference image, are applied to the similar region 1116 having a high correlation with the reference region 1121 of the comparison image. In this case, RAW data designated in advance such as a test chart shown in FIG. 7 may be used as a comparison image. The test chart shown in FIG. 7 is an example of an image which has a low spatial frequency on an image central portion and a high spatial frequency on an image peripheral portion. Note that there are test charts that record various spatial frequency patterns, and the characteristics of the image process can be recognized at a glance by executing the exposure and development processes of the test charts.

Using such test charts, the user can recognize a spatial frequency region similar to the reference region 1121 from the test charts upon adjusting the parameters for the development process. In other words, when the parameters for the development process are adjusted with reference to the similar region 1116 on the test chart, versatile parameters for the development process can be obtained. That is, since the user can recognize the correspondence between a region in a normal photographic image such as a landscape photography or portrait and a region of the test chart, he or she can efficiently adjust the versatile parameters for the development process.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

An embodiment of the present invention can provide an image processing apparatus for applying a development process to a photographic image, comprising: demosaicing means for applying a demosaicing process to the photographic image; image processing means for generating a display image from the photographic image to which the demosaicing process is applied; inputting means for inputting an instruction indicating a reference region of the display image, and an adjustment instruction of a parameter for the development process of the photographic image; extracting means for extracting an image region having a high correlation with the reference region as a similar region; and generating means for generating display images of the reference region and the similar region by applying the parameter for the development process to the photographic image before the demosaicing process, which corresponds to the reference region, and the photographic image before the demosaicing process, which corresponds to the similar region.

Such an image processing apparatus further comprises displaying means for displaying an image obtained by superimposing the display images of the reference region and the similar region on the display image of the photographic image on a monitor.

Preferably, the extracting means extracts as the similar region an image region which has a high correlation with the reference region and is other than the reference region.

Preferably, the extracting means extracts as the similar region an image region which has a high correlation with the reference region from a photographic image which is to undergo the development process.

Preferably, the extracting means extracts as the similar region an image region which has a high correlation with the reference region from a predetermined image.

Preferably, the predetermined image is a test chart which has a characteristic in which an image on a central portion has a low spatial frequency, and an image on a peripheral portion has a higher spatial frequency.

Another embodiment of the invention can provide, an image processing method of applying a development process to a photographic image, comprising the steps of: applying a demosaicing process to the photographic image; generating a display image from the photographic image to which the demosaicing process is applied; inputting an instruction indicating a reference region of the display image, and an adjustment instruction of a parameter for the development process of the photographic image; extracting an image region having a high correlation with the reference region as a similar region; and generating display images of the reference region and the similar region by applying the parameter for the development process to the photographic image before the demosaicing process, which corresponds to the reference region, and the photographic image before the demosaicing process, which corresponds to the similar region.

A further embodiment of the invention can provide a storage medium storing program code for programming processing means to carry out the abovementioned method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-186503, filed Jul. 17, 2008, which is hereby incorporated by reference herein its entirety.

What is claimed is:

1. An image processing apparatus for applying a development process to a photographic image, comprising:
an image processor, configured to generate a display image from the photographic image;
an input section, configured to input an instruction indicating a reference region of the display image, and an adjustment instruction of a parameter for the development process of the photographic image;
an extractor, configured to extract, as a similar region, an image region having a high correlation with the reference region; and
a generator, configured to generate display images of the reference region and the similar region by applying the parameter for the development process to the photographic image, which corresponds to the reference region, and the photographic image which corresponds to the similar region.

2. The apparatus according to claim 1, further comprising a demosaicing section configured to apply a demosaicing process to the photographic image, wherein the generator generates the display images of the reference region and the similar region before the demosaicing section applies the demosaicing process.

3. The apparatus according to claim 1, further comprising a displaying section configured to display an image obtained by superimposing the display images of the reference region and the similar region on the display image of the photographic image on a monitor.

4. The apparatus according to claim 1, wherein said extractor extracts as the similar region an image region which has a high correlation with the reference region and is a region other than the reference region.

5. The apparatus according to claim 1, wherein said extractor extracts as the similar region an image region which has a high correlation with the reference region from a photographic image which is to undergo the development process.

6. The apparatus according to claim 1, wherein said extractor extracts as the similar region an image region which has a high correlation with the reference region from a predetermined image.

7. The apparatus according to claim 6, wherein the predetermined image is a test chart which has a characteristic in which an image on a central portion has a low spatial frequency, and an image on a peripheral portion has a higher spatial frequency.

8. The apparatus according to claim 1, wherein the photographic image is an image included in a plurality of photographic images and wherein the development process is a process common to the plurality of photographic images.

9. The apparatus according to claim 8, wherein the similar image region is an image region extracted from a photographic image different from the photographic image including the reference region.

10. A method executed by an image processing apparatus for applying a development process to a photographic image, the method comprising:
generating a display image from the photographic image;
inputting an instruction indicating a reference region of the display image, and an adjustment instruction of a parameter for the development process of the photographic image;
extracting, as a similar region, an image region having a high correlation with the reference region; and
generating display images of the reference region and the similar region by applying the parameter for the development process to the photographic image, which corresponds to the reference region, and the photographic image which corresponds to the similar region.

11. The method according to claim 10, further comprising applying a demosaicing process to the photographic image after generating the display images of the reference region and the similar region.

12. A computer-readable storage medium storing a computer-executable program for causing a computer to execute an image processing method for applying a development process to a photographic image, the method comprising:
generating a display image from the photographic image;

inputting an instruction indicating a reference region of the display image, and an adjustment instruction of a parameter for the development process of the photographic image;

extracting, as a similar region, an image region having a high correlation with the reference region; and generating display images of the reference region and the similar region by applying the parameter for the development process to the photographic image, which corresponds to the reference region, and the photographic image which corresponds to the similar region.

13. The computer-readable storage medium according to claim 12, the method further comprising applying a demosaicing process to the photographic image after generating the display images of the reference region and the extracted region.

14. An image processing apparatus for applying a development process to a photographic image, comprising:

an image processor, configured to generate a display image from the photographic image;

an input section, configured to input an instruction indicating a reference region of the display image, and an adjustment instruction of a parameter for the development process of the photographic image;

an extractor, configured to extract an image region which corresponds to the reference region; and a generator, configured to generated display images of the reference region and the extracted region by applying the parameter for the development process to the photographic image, which corresponds to the reference region, and the photographic image which corresponds to the extracted region.

15. The apparatus according to claim 14, further comprising a demosaicing section configured to apply a demosaicing process to the photographic image, wherein the generator generates the display images of the reference region and the extracted region before the demosaicing section applies the demosaicing process.

* * * * *